No. 855,617. PATENTED JUNE 4, 1907.
A. C. CULVER.
VALVE MECHANISM.
APPLICATION FILED AUG. 13, 1906.

Witnesses:
Thos. W. Thompson
William T. Hewett

Inventor
A. C. Culver.
By his Attorney
Edward N. Pagelsen.

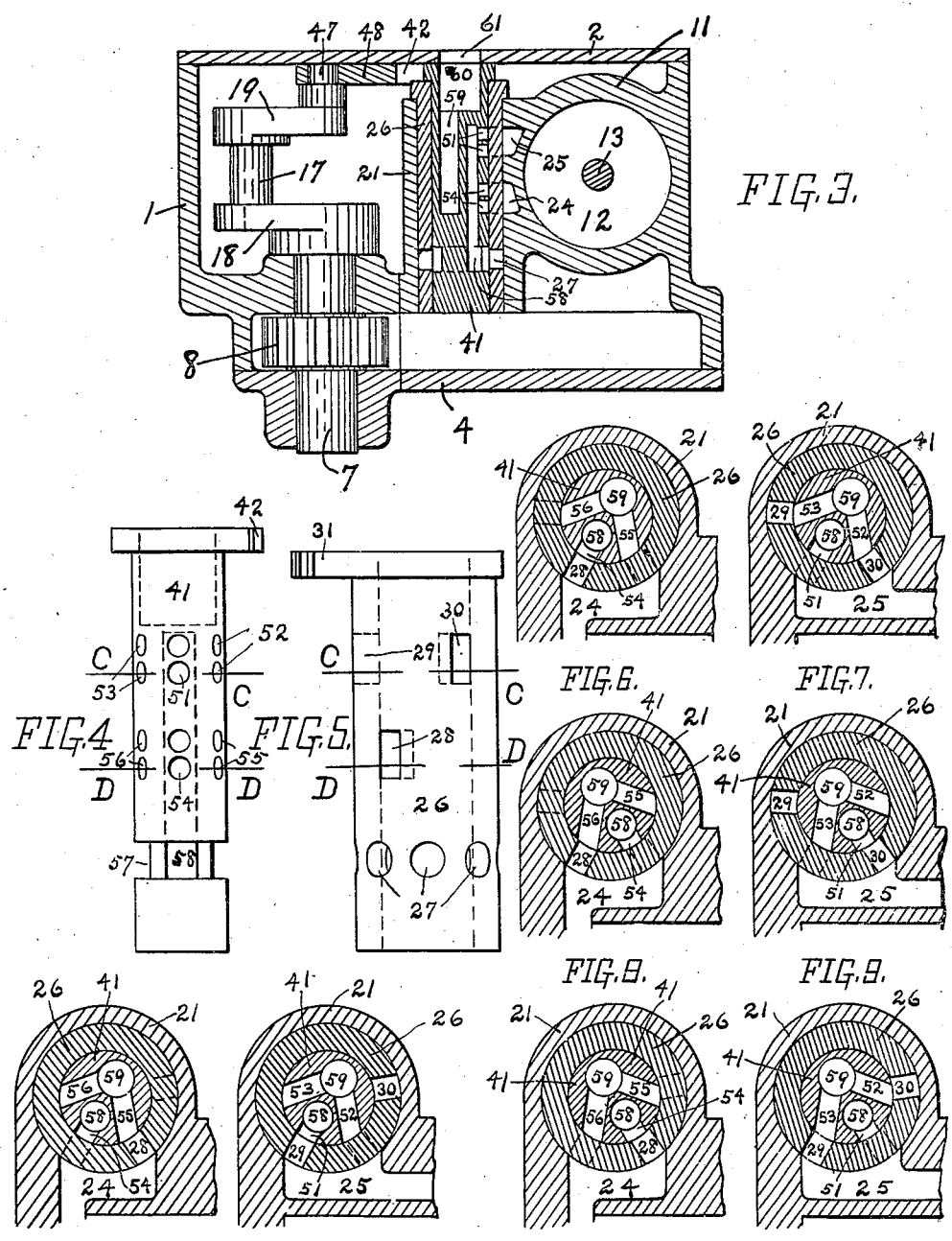

UNITED STATES PATENT OFFICE.

ARTHUR C. CULVER, OF DETROIT, MICHIGAN.

VALVE MECHANISM.

No. 855,617.  Specification of Letters Patent.  Patented June 4, 1907.

Application filed August 13, 1906. Serial No. 330,378.

*To all whom it may concern:*

Be it known that I, ARTHUR C. CULVER, a citizen of the United States, and a resident of Detroit, in the county of Wayne and State of Michigan, have invented a new and Improved Valve Mechanism, of which the following is a specification.

This invention relates particularly to fluid pressure operated engines, particularly compressed air driven engines, and the object of my improvements is to provide a valve mechanism for reversible multi-cylinder air engines which shall be simple and compact.

My invention consists of a plurality of engines, a cylindrical valve for each engine, which valve may be operated by an adjacent engine, a sleeve for each valve, the position of the sleeve determining the direction of revolution of the engines, and means for changing the position of all the sleeves simultaneously.

My invention consists more particularly in the construction and operation of the engine valves and their sleeves, and the manner of reversing the direction of the engines.

Figure 1:
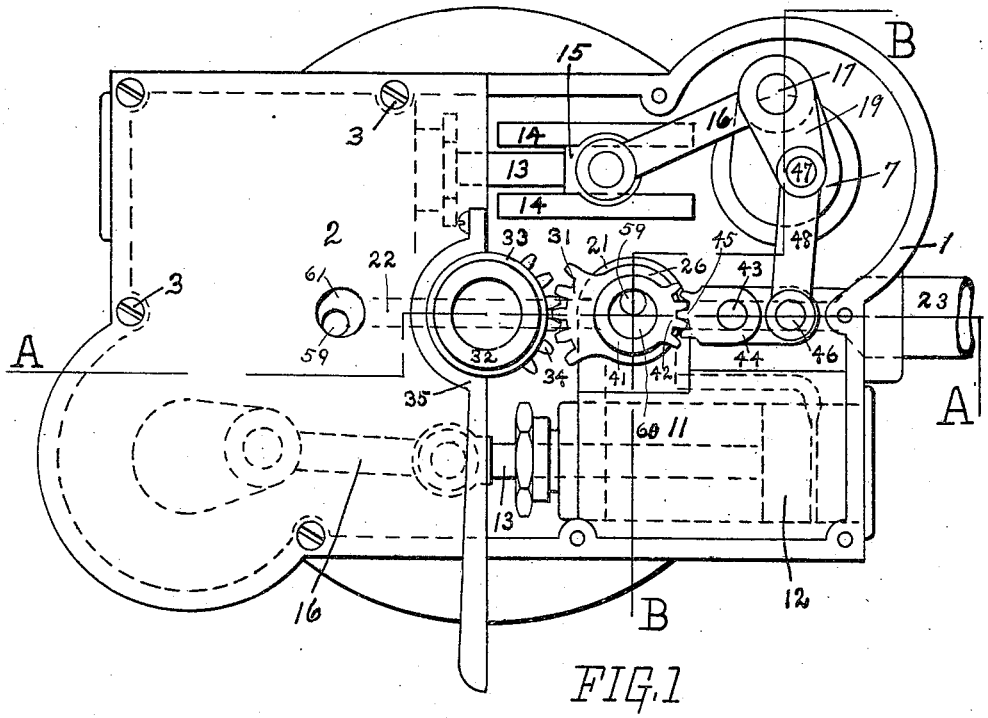
Figure 2:
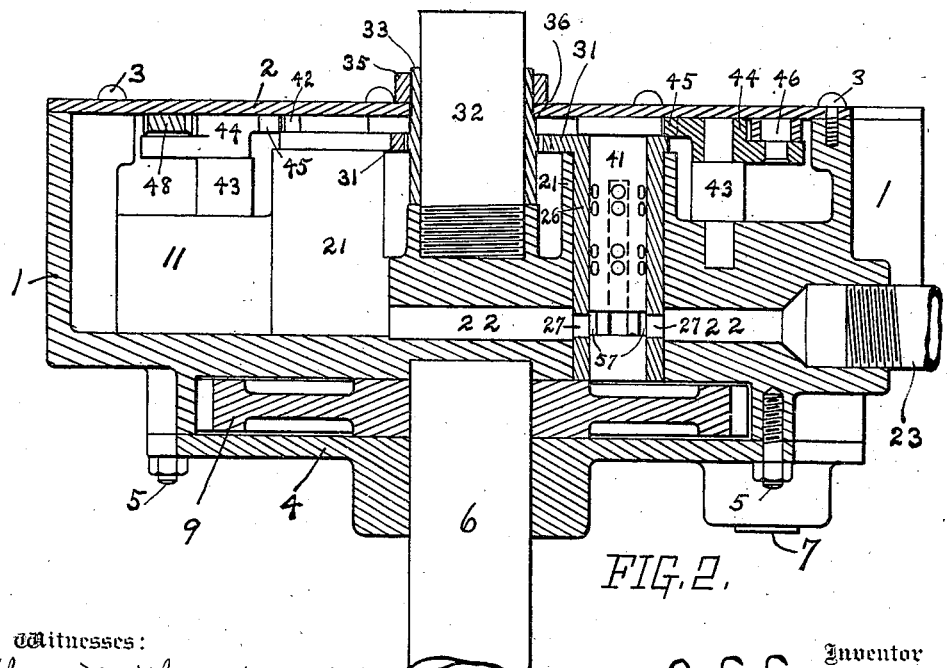

An embodiment of my invention is illustrated in the accompanying drawings in which Figure 1 is a plan of an engine and frame, one half of the cover being broken away. Fig. 2 is a vertical cross section on the line A—A of Fig. 1. Fig. 3 is a vertical cross section on the line B—B of Fig. 1. Fig. 4 is a view of a valve. Fig. 5 is a view of a valve sleeve. Figs. 6, 8, 10 and 12 are cross sections of the valve and sleeve on lines D—D of Figs. 4 and 5, showing the parts in various positions. Figs. 7, 9, 11 and 13 are cross sections of the same on lines C—C of Figs. 4 and 5.

Similar reference characters refer to like parts throughout the several views.

The frame 1 is provided with a cover 2, secured thereto by screws 3. A removable bearing plate 4 is secured to the lower side of the frame by the stud screws 5 and furnishes bearings for the main shaft 6 and the crank shafts 7. A pinion 8 is secured to each crank shaft 6 and meshes with a gear 9 secured to the main shaft 6, and by means of these wheels the motion of the crank shafts is transmitted to the main shaft.

The frame 1 forms part of and supports the remainder of the twin compressed air engines, each of which comprises a cylinder 11, a piston rod 13, guides 14, cross head 15, connecting rod 16, crank pin 17, lower crank 18 united with the crank shaft 7, and upper crank 19 to actuate the valve mechanism of the adjacent engine. The cylinders 11 and guides 14 of the engines shown are parallel but their relative position may be varied as desired. The details of these parts may conform to any good factory usage.

Projecting from the side of the cylinders are the cases 21, whose bores are connected and connect to the air pipe 23 by means of the passages 22. The bores are also connected to the front ends of the cylinders by means of the passages or ports 24, and with the rear ends of the cylinders by means of the passages or ports 25.

Revoluble in the valve cases are sleeves 26 provided with openings 27 to permit the free passage of the operating fluid, ports 28, 29 and 30 to permit the operating fluid to pass into and out of the passages 24 and 25, and a segmental gear 31 at its upper end. A tube 32 is screwed into the frame and on it is revoluble the sleeve 33 which is provided with toothed segments 34 to mesh with the segment 31 on each sleeve. A handle 35 secured to the upper end of the sleeve 33 enables the operator to turn the sleeves as desired. A shoulder 36 on the sleeve bears against the plate 2, and is thus held in position.

Revoluble in the sleeve 26 is the valve 41 which is provided with a segmental gear 42 at its upper end. A pin 43 is mounted on the frame and carries the lever 44, which lever has a segmental gear 45 at the edge of one arm to engage the segment 42 on the valve. A pin 46 on this lever is connected to the pin 47 on the upper crank 19 by the link 48. It will be noticed that the pin 47 is eccentric to the shaft 7, which eccentricity causes the swinging of the lever 44 and the oscillation of the valve. The two engines shown are connected "on the quarter", and therefore the valve for the lower engine in Fig. 1 must needs be on center before the upper engine reaches the half stroke. The cranks 19 are therefore placed so the valves will have the lead indicated in Fig. 1. From inspection of Fig. 1, it will be seen that the valve will oscillate each way from that position under the action of the lever 44. From Figs. 4 to 13 inclusive it will be seen that when the valve is central its ports 51 and 54 will be vertically below the center and therefore closed by the sleeve 26. But when swung either way from the middle position, the operative fluid can pass from the passage 22, through the holes 27 in the sleeve 26 into the annular groove 57 in the valve. The longitudinal bore 58 connects with this groove and with the admission ports 51 and 54 of the valve. The valve has a second bore 59 which connects with the exhaust ports 52, 53, 55 and 56. These ports in the valve are preferably drilled in pairs which is the easiest way to form them in the hard steel that is employed, but one long port could be made as in the sleeve. The exhaust passes up through the bore 59, the enlarged counter bore 60, and the opening 61 in the plate 2 into the atmosphere.

The operation of the valve is as follows. Under the action of the lever 44 the valve rocks from the position shown in Figs. 6 and 7 to that shown in Figs 8 and 9. When in the position shown in Figs. 6 and 7, the lower port 54 of the valve permits the operative fluid to pass from the annular passage 57, up bore 58 and out into the passage or port 24 to the front end of the cylinder to drive back the piston. At the same time the upper port 52 (see Fig. 7) connects the passage or port 25, leading to the rear end of the cylinder, with the exhaust bore 59 and the atmosphere. The movement of the piston turns the shaft 6 and both crank shafts with it so that its complete stroke in one direction brings the parts to the positions shown in Figs. 8 and 9. Here the port 24 is in connection with the exhaust and the port 25 with the pressure insuring the return of the piston and the continued revolution of the shaft.

It will be noticed that the sleeve 26 has three ports 28, 29 and 30, and that the port 29 has not been employed in the foregoing operation of the engine, being closed by a blank wall of the valve casing. But if the sleeve be turned about sixty degrees by the handle 35, the ports will assume the position indicated in Figs. 10 to 13. The movement of the valve remains the same as before, but for like positions of the valve the movement of the piston will be reversed. The port 30 in the sleeve 26 now becomes closed and the port 29 operative. Thus by merely swinging the handle 35, the engine is caused to run in opposite directions.

Each engine operates the valve mechanism of the other thus permitting close connection. As will be noticed from the solid and dotted lines of the ports in Figs. 6, 7, 12 and 13, the necessary lap is easily provided for.

Having now explained my improvements what I claim as my invention and desire to secure by Letters Patent is,—

1. In a reversing valve mechanism for expansion engines, the combination of a crank, a valve lever having one end provided with teeth, a link connecting the other end of said lever to said crank, a cylindrical valve provided with teeth at one end, a sleeve surrounding said valve and provided with ports so positioned that their position will determine the direction of revolution of the engine, and means for positioning the sleeve.

2. The combination in twin engines and crank shafts for the same, of valve mechanism for each engine comprising a valve lever, a valve connected to one end of said lever, a link connecting said lever to the adjacent crank shaft, a sleeve surrounding said valve and provided with ports and with teeth at the upper end thereof, a centrally mounted sleeve having segments of teeth to engage the teeth of the valve sleeves, and a lever to operate said central sleeve and thereby the valve sleeves, whereby by positioning the ports in said valve sleeves the direction of rotation of said engines will be determined.

3. In a reversing valve gear for fluid operated engines, a valve comprising a cylindrical body formed with an annular groove near one end, a longitudinal bore connecting to said groove, admission ports connecting to said bore, a longitudinal exhaust bore extending through one end of the valve, and exhaust ports connecting to said exhaust bore; a sleeve surrounding said valve and provided with a plurality of sets of ports; means for operating said valve and means to position said sleeve to determine the direction of revolution of said engine.

4. In a valve mechanism for reversible engines, the combination of a cylinder, a valve chamber therefor, said cylinder having passages, one for each end, connecting to said chamber at different points in the length of said chamber, a sleeve mounted in said chamber having two ports adapted to alternately connect with one of said passages, and a single port connecting with the other passage, means to position said sleeve, and a valve mounted in said sleeve and provided with oppositely extending longitudinal bores and ports connected thereto so that said bores may alternately connect with the passages in said cylinder.

5. In a valve mechanism for reversible twin engines, the combination of cylinders, valve chambers therefor, a sleeve provided with ports revoluble in each valve chamber, the position of the sleeve determining the direction of rotation of the engine, a valve revolubly mounted in each sleeve, a crank and crank shaft for each cylinder, and connections between the crank of each engine and the valve of the other engine so adjusted that the periodic opening of the ports of each valve shall be in advance of the corresponding movement of the crank of its engine.

6. In a reversible engine, the combination of a cylinder, a valve chamber, passages connecting the ends of the cylinder and the valve chamber, a passage connecting to the lower end of said valve chamber to convey the expansive fluid to the same, a sleeve movably mounted in said chamber and provided with a plurality of sets of ports, each set adapted to connect with the passages to the cylinder, and a valve rotatably mounted in said sleeve, said valve having a longitudinal bore connecting with the passage at the lower end of the valve chamber and having ports to connect with said bore to permit the expansive fluid to flow through the ports in the sleeve to cylinder, and also provided with a second longitudinal bore and ports whereby the expansive fluid may flow from the cylinder.

In testimony whereof I sign my name in the presence of two subscribing witnesses.

ARTHUR C. CULVER.

Witnesses:
GEO. W. BARNES,
EDWARD N. PAGELSEN.